United States Patent [19]

Bronowicki et al.

[11] Patent Number: 5,022,272

[45] Date of Patent: Jun. 11, 1991

[54] LOCALLY COMPENSATED DEFORMATION SENSOR

[75] Inventors: Allen J. Bronowicki, Laguna Niguel; Todd L. Mendenhall, Redondo Beach, both of Calif.

[73] Assignee: TRW Inc., Redondo Beach, Calif.

[21] Appl. No.: 450,714

[22] Filed: Dec. 14, 1989

[51] Int. Cl.[5] ............................................. G01B 7/16
[52] U.S. Cl. ..................................................... 73/772
[58] Field of Search ................. 73/763, 767, 769, 772, 73/775, 786, 708, 766, 862.63

[56] References Cited

U.S. PATENT DOCUMENTS

| | | | |
|---|---|---|---|
| 2,597,751 | 5/1952 | Ruge | 73/772 |
| 3,184,962 | 5/1965 | Gay | 73/775 |
| 4,418,577 | 12/1983 | Arieh et al. | 73/772 |
| 4,674,342 | 6/1987 | Ushijima et al. | 73/862.63 |

FOREIGN PATENT DOCUMENTS

| | | | |
|---|---|---|---|
| 0714181 | 2/1980 | U.S.S.R. | 73/862.63 |
| 2107876 | 5/1983 | United Kingdom | 73/766 |

Primary Examiner—Robert Raevis
Attorney, Agent, or Firm—Noel F. Heal; Sol L. Goldstein

[57] ABSTRACT

A deformation sensing device, and related method, for measuring overall deformation of a structural member subject to deformation by an actuator. The device includes a first sensor located in a region of influence of the actuator and a second sensor located outside but near to the region of influence of the actuator. The device takes a weighted average of output signals from the two sensors, using weighting factors that, in one embodiment, are applied either electronically and are selected either as proportional to the lengths of the member regions under the influence of the actuator and not under the influence of the actuator, or are selected to provide a desired transfer function between input to the actuator and output from the sensing device. In other embodiments, weighting of the output signals is obtained by using different surface areas for the sensors or by appropriately positioning two shear-mode sensors in relation to the region of influence of the actuator.

12 Claims, 4 Drawing Sheets

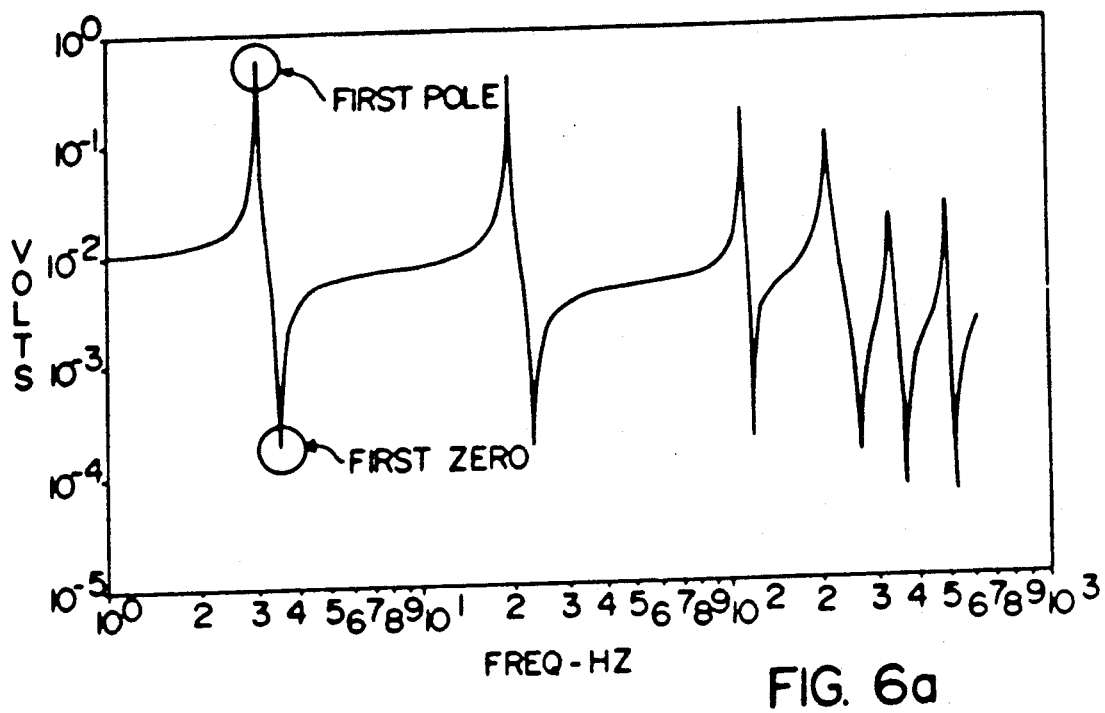
FIG. 6a
FIG. 6b
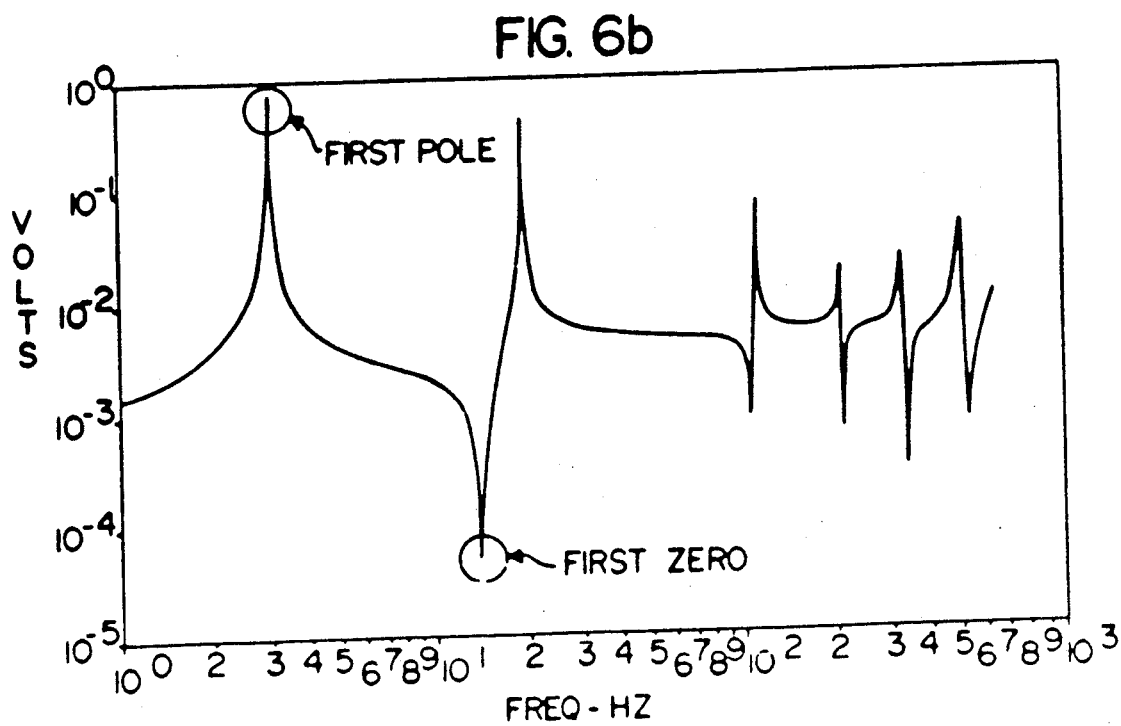

LOCALLY COMPENSATED DEFORMATION SENSOR

BACKGROUND OF THE INVENTION

This invention relates generally to deformation sensors and, more particularly, to techniques for measuring overall deformation in a structure that is subject to vibration or shape control using local deformation actuators. Piezoelectric devices are useful in controlling the shape and vibration of mechanical structures, such as in truss or bending members of large mechanical structures in space, in panels, or in large adaptive optical structures.

If a structural element is deliberately deformed by a finite number of deformation actuators, the strain distributions due to these local actuators will be highly non-uniform. There will be virtual strain discontinuities at the edges of the deformation actuators. For example, consider the case of a cantilever beam deformed by bending near its supported end, using a single actuator. The deformation will be concentrated at one small region and the remaining portions of the beam will show little or no local strain. Clearly, any locally positioned sensor will be sensitive only to the strain in the local region, but what is usually of more interest is the strain in a more global sense. The overall or average deformation is of interest because, in most vibration and shape control applications, there is a need to sense the effect of both structural stresses and the stresses induced by actuators, and to control the actuators accordingly to achieve a desired result, such as a desired shape or a reduction in vibrational motion.

One approach to measuring the end-to-end elongation of an axial member is to run an optical fiber along or through the member and to measure its length change using laser interferometry or reflectometry techniques. Free-field optical sensors could also be used instead of fiber optic sensors. For instance, optical laser interferometers can be employed inside hollow tubes to measure length changes from a light source at one end to a reflective target at the other end. The principal problems associated with these optical devices are their cost, large size, large weight, power consumption, limited dynamic range, complexity, and susceptibility to damage from mechanical shock. A further problem with fiber optical sensors is their high sensitivity to temperature changes.

Another technique for obtaining a global measure of deformation is to average the signals derived from a large number of local strain sensors. The difficulty with this approach is that it requires a large number of electrical connections to power and monitor the sensors. Complexity and reliability are major design issues in such an arrangement.

It will be appreciated from the foregoing that there is a need for a simplified approach for estimating the end-to-end or global deformation of a structural member having local deformation actuators. As will become apparent from the following summary, the present invention satisfies this need.

SUMMARY OF THE INVENTION

The present invention resides in a deformation sensing device and related method for its use, for estimating the average overall deformation of a structural member subject to deformation by an actuator. Briefly, and in general terms, the device of the invention includes a first sensor, referred to as the collocated sensor, positioned on the structural member in a region of influence of an actuator operating on the structural member, a second sensor, referred to as the nearly collocated sensor, positioned on the structural member outside the region of influence of the actuator, and means for combining output signals generated by the collocated sensor and the nearly collocated sensor in such a way as to yield a composite signal approximately proportional to the average strain over the entire structural member.

In one form of the device the means for combining the output signals of the sensors includes means for multiplying the output of the collocated sensor by a weighting factor proportional to the length of the region of influence of the actuator, to obtain a first weighted output, means, for multiplying the output of the nearly collocated sensor by a weighting factor proportional to the length of the structural member excluding the region of influence of the actuator, to obtain a second weighted output, and means for adding the weighted outputs to obtain the composite signal.

In another embodiment of the device, the means for combining the output signals of the sensors includes means for multiplying the outputs of the sensors by respective weighting factors, to obtain weighted outputs, and means for adding the weighted outputs to obtain the composite signal, wherein the weighting factors are selected to provide a desired transfer function between the actuator input signal and the composite output signal.

In one form of the device, the collocated sensor and the nearly collocated sensor are lateral-mode piezoelectric sensors, and the ratio of the surface area of the collocated sensor to the surface area of the nearly collocated sensor is approximately the same as the ratio of length of the region of influence of the actuator to the length of the structural member excluding the region of influence of the actuator. The means for combining the output signals then functions to add the two output signals.

In another form of the device, the collocated sensor and the nearly collocated sensor are shear-mode piezoelectric sensors connected by a bridge. The ratio of the length of the bridge overlapping the region of influence of the actuator to the length of the bridge not overlapping the region of influence of the actuator is approximately the same as the ratio of the length of the region of influence of the actuator to the length of the structural member excluding the region of influence of the actuator.

In terms of a novel method, the invention includes the steps of placing a first deformation sensor in a region of influence of an actuator coupled to a structural member, placing a second deformation sensor immediately outside the region of influence of the actuator, and combining output signals generated by the first and second deformation sensors in such a way as to yield a composite signal approximately proportional to the average strain over the entire structural member. The method of the invention includes the same variant approaches to generating a weighted average for the composite output signal.

It will be appreciated from the foregoing that the present invention represents a significant advance in the field of deformation sensors. In particular, the invention provides a simple but accurate technique for estimating the average overall deformation of a structural member,

BRIEF DESCRIPTION OF THE DRAWINGS

FIG. 6a is a graph of a typical transfer function between the input signal to an actuator and the output signal from the collocated sensor, over a range of frequencies; and FIG. 6b is a graph similar to FIG. 6a, but plotting the transfer function from the input signal to the composite output signal, using relative weighting factors of 1.0 and 9.0.

DESCRIPTION OF THE PREFERRED EMBODIMENTS

Figure 1:
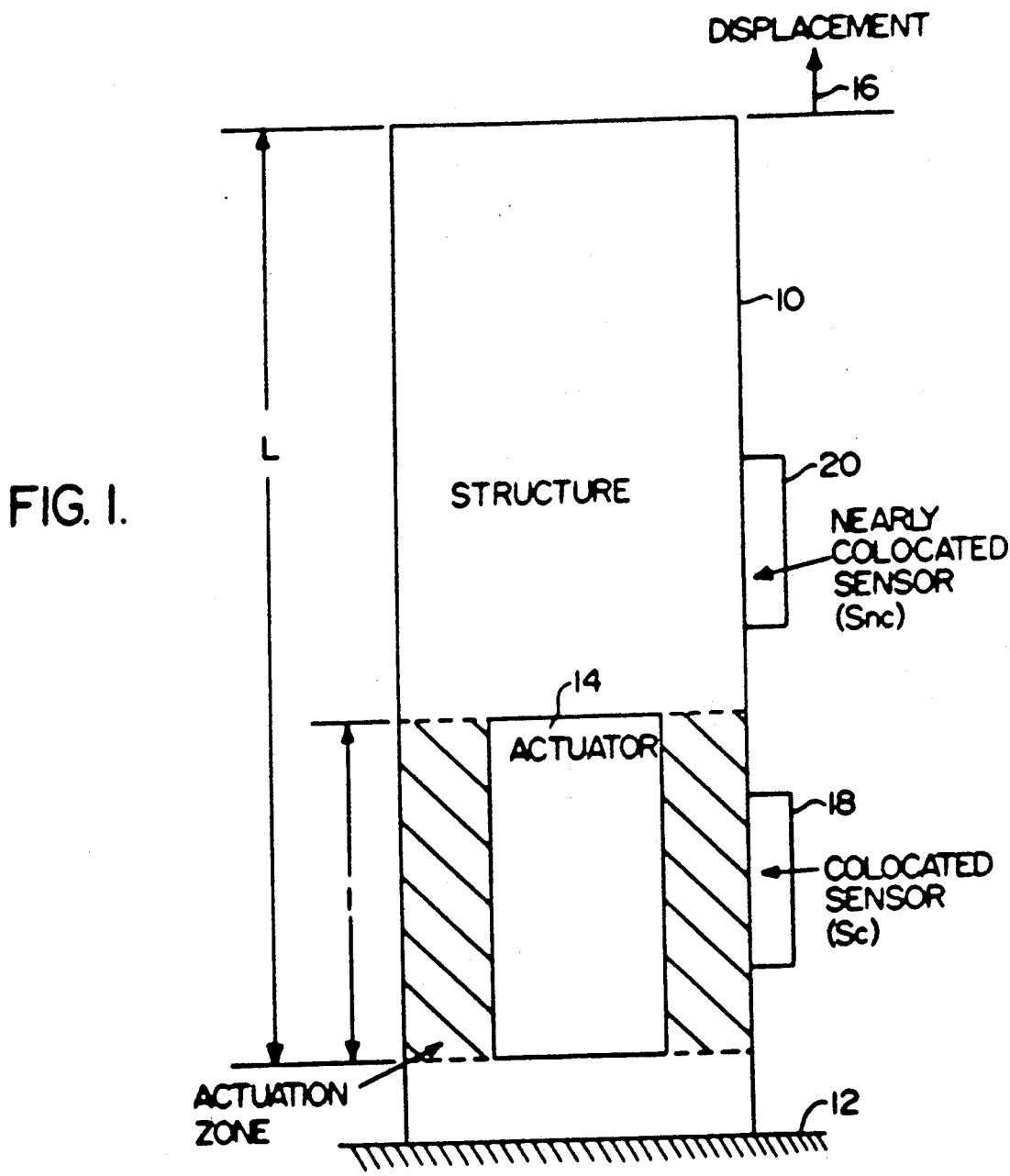
FIG. 1 is a simplified elevational view of a cantilever beam having an overall extensional deformation caused by a single actuator and sensed by a pair of local deformation sensors in accordance with the present invention.

As shown in the drawings, the present invention is principally concerned with techniques for sensing overall or global deformation in a structural member that has been deformed by a locally positioned deformation actuator. FIG. 1 shows a structural member, indicated by reference numeral 10, which may be a cantilever beam extending outward from a fixed support 12, or a column supported at its base. The member 10 is subject to extensional deformation by an actuator 14 located near the support. The extensional displacement caused by the actuator 14 is indicated at 16. The member 10 may also be subject to structural deformation from a variety of causes, such as thermal expansion or external loading. In the past, the measurement of overall deformation has required the use of complex and less than satisfactory optical techniques, or the use of a large number of sensors distributed along the structural member.

In accordance with the present invention, overall deformation is closely estimated from the outputs of just two deformation sensors, indicated at 18 and 20. The first sensor 18 is referred to as the collocated sensor, since it is installed within the realm or region of influence of the actuator 14. The second sensor 20 is referred to as the nearly collocated sensor, and is installed near the actuator 14 but outside its realm of direct influence. The extent of region of influence of the actuator 14 will depend on a variety of factors, including the size of the actuator, the cross-sectional size of the structural member 10, the manner in which the member is supported or connected to other structural members, and so forth. For a particular application, the region of influence of an actuator can be determined theoretically or empirically.

The principle of the invention is to take a weighted sum of the signals from the two sensors, to produce a single averaged signal representing overall deformation of the structure in the vicinity of the actuator 14.

Figure 2:
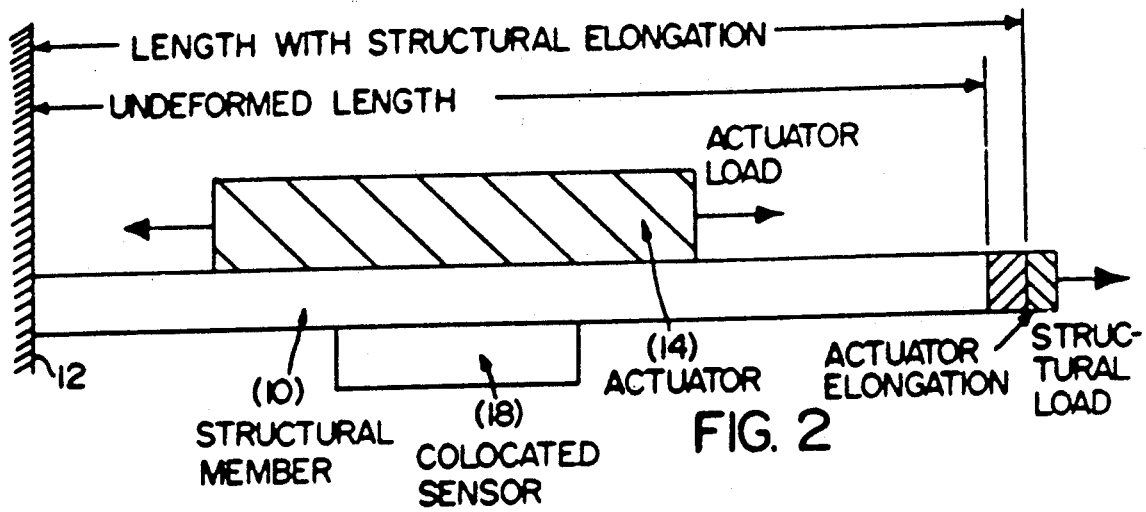
FIG. 2 is a view similar to FIG. 1, but showing how a sensor located in the same region as an actuator can detect both structural elongation and actuator deformation.

As shown in FIG. 2, the overall deformation of the structural member 10 can be due to two major components. The first will be referred to as structural deformation or elongation, by which is meant a global deformation caused by temperature change, inertial forces, or other causes affecting the entire structural member. The other type of deformation or elongation is referred to as actuator elongation, i.e. the elongation caused by the actuator attached to the member. The collocated sensor 18 will sense both types of elongation, since the region of the structural member adjacent to the actuator is subject to deformation by both the actuator and any global forces acting to deform the structure. In many cases, the actuator load, i.e. the load placed on the member by the actuator, is much greater than the structural load on the member from other sources, and the sensor output tends to be overwhelmed by the actuator load. This is why a single collocated sensor 18 would be unable to estimate accurately the overall deformation of the member. Information is also needed concerning the structural deformation in the region not influenced by the actuator. This is the role of the nearly collocated sensor 20. The principle of the invention is to combine the two readings and give them appropriate weight to yield an accurate estimate of the overall deformation of the structural member.

The deformation actuator 14 could be a piezoelectric ceramic material embedded in or bonded to the structural member 10. A voltage applied to the actuator 14 causes it to expand or contract laterally, depending on the polarity of the voltage. Other possibilities for the actuator are thermal expansion actuators controlled by temperature, or shape memory metals. The sensors 18, 20 are also preferably piezoelectric, in which lateral displacement of their material will cause a proportional voltage output. Resistive strain gauges might also be used for the sensors 18, 20.

A first possibility for weighting the sensor outputs is to weight them in accordance with the lengths of the regions that they monitor. If uniform strain states are assumed to be present in the actuated and non-actuated portions of the member 10, one could infer the total average strain in the member based on the relative lengths of the two regions. For example, if the un-actuated portion of the member accounts for 90% of the member length, the nearly collocated sensor 20 should be weighted nine times more heavily than the collocated sensor 18. By this means, two strain readings in the vicinity of the actuator 14 can be used to extrapolate and determine the net elongation over a considerably greater region of the structural member.

More specifically, if L is the total member length and l is the length of the actuated portion, then (L−l) is the un-actuated length. If $\epsilon_A$ is the extensional strain in the actuated portion of the member and $\epsilon_U$ is the extensional strain in the un-actuated portion, then the total extension in the member will be:

$$\Delta_{Total} = \epsilon_A l + \epsilon_U(L-l).$$

The average strain $\epsilon_{Average}$ will be simply the total extension divided by the total length, or:

$$\epsilon_{Average} = \Delta_{Total}/L$$
$$= \epsilon_A l/L + \epsilon_U(L-l)/L.$$

Figure 1A:
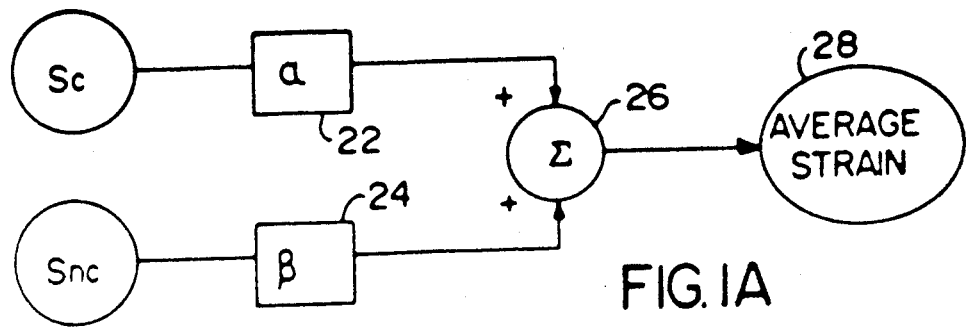
FIG. 1A is a simplified schematic diagram showing how a global deformation signal is obtained from the two sensors of FIG. 1.

Thus, to achieve an average strain reading over the entire member, one would apply to the strain readings from the collocated and nearly collocated sensors 18, 20, respectively, the weighting coefficients $\alpha = l/L$ and $\beta = (L-l)/L$. FIG. 1a shows the two sensor output signals $S_C$ and $S_{NC}$ operated on by two weighting multipliers 22, 24, which multiply the output signals by factors $\alpha$ and $\beta$, respectively. The resultant weighted signals are combined in an adder 26, to produce the composite output signal, as indicated at 28.

Figure 3:
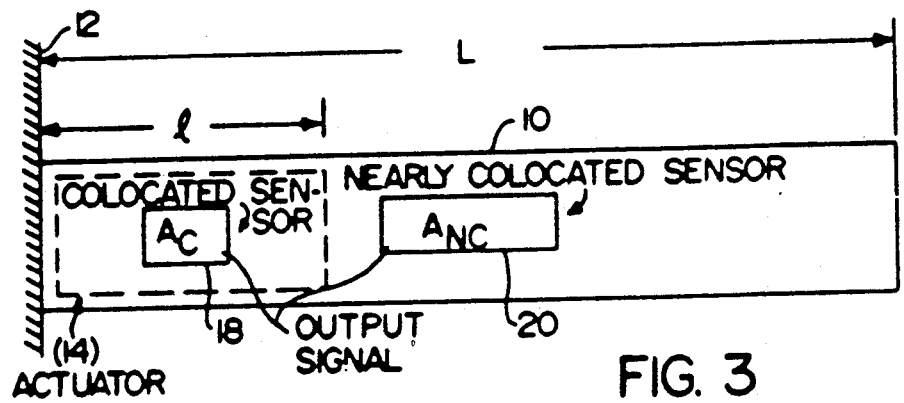
FIG. 3 is a view similar to FIG. 1, but showing an alternate embodiment of the invention using averaging by area ratio.

Another approach is to weight the sensor outputs by arranging for different relative strengths in the signals generated by the two sensors 18, 20. In the case of lateral-mode piezoelectric sensors, the voltage generated is proportional to the strain and the effective area of the sensor in contact with the member. Thus, as shown in FIG. 3, if the sensor areas are $A_C$ and $A_{NC}$ for the collocated and the nearly collocated sensors, and if the actuator region is of length l and the member length is L, then a measure of average strain in the structural member can be obtained by choosing the sensor areas to be in the same ratio as the lengths, that is:

$$A_{NC} = A_C \cdot (L-l)/l.$$

Basically, this has the same effect as the electronic averaging discussed with reference to FIG. 1a.

Figure 4:
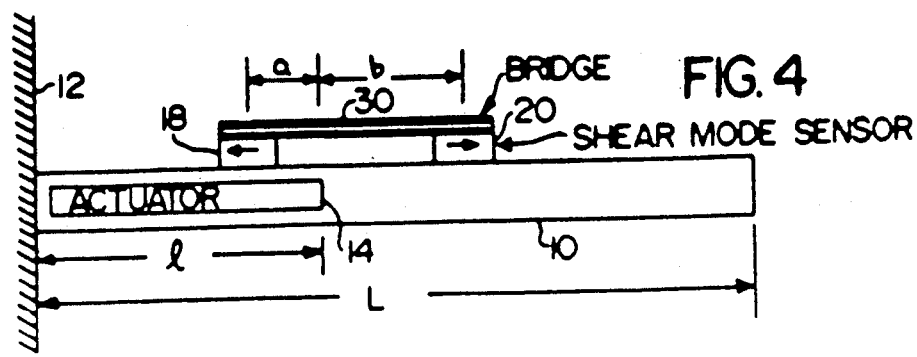
FIG. 4 is a view similar to FIG. 1, but showing another alternative embodiment of the invention using averaging by relative position of shear-mode sensor elements.

Yet another approach to weighting the two sensor signals is shown in FIG. 4. In this case the sensors 18, 20 are shear-mode sensors connected together by a rigid bridge 30 and placed on the member 10 such that the sensor 18, the collocated sensor, is positioned over the actuator, and sensor 20 is the nearly, collocated sensor. As disclosed in a concurrently filed application by one of the present inventors, entitled "Shear Mode Extensional Deformation Sensor," this combination of shear-mode sensors produces a measure of overall deformation without the drawbacks of most lateral-mode sensors. In the arrangement as shown in FIG. 4, the pair of sensors 18, 20 is positioned such that sensor 18 is centered at a distance 'a' from extremity of the actuator 14 nearest the region in which the nearly collocated sensor 20 is positioned, and the nearly collocated sensor 20 is centered at a distance 'b' from the same extremity of the actuator. Moreover, the distances a and b are chosen such that:

$$b/a = (L-l)/l.$$

Figure 5A:
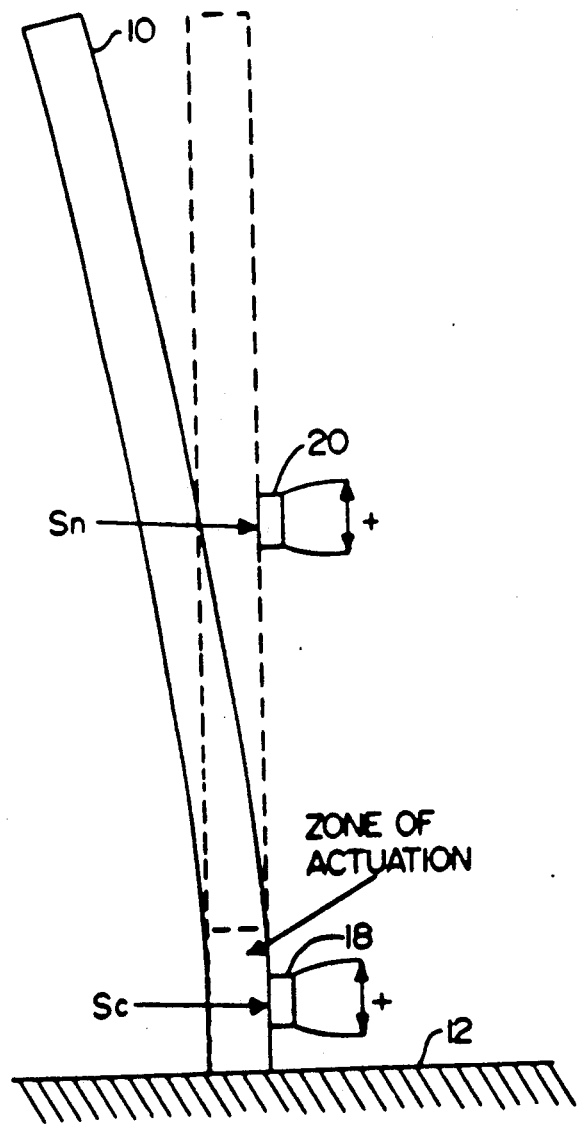
FIGS. 5a and 5b are views similar to FIG. 1, but showing the effects of vibration of the structural member in two different modes.
Figure 5B:
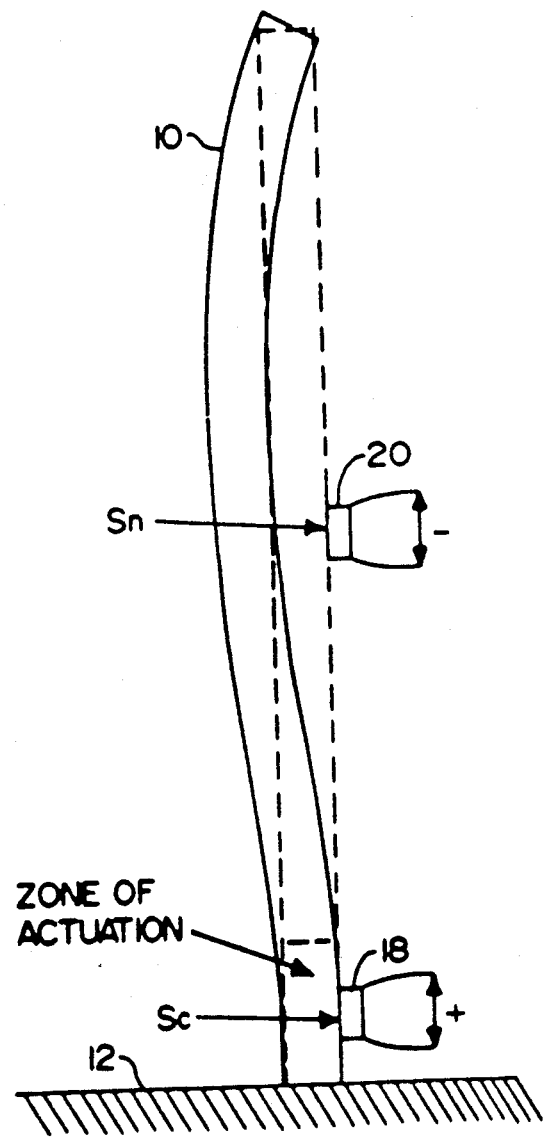

In some applications involving vibration damping of structures, more complex considerations may apply when choosing appropriate weighting factors for the outputs of the sensors 18, 20. FIG. 5a shows in exaggerated form how vibration in a particular mode can affect the output from the nearly collocated sensor 20. Here it is assumed that the actuator operates to bend the member near the support, in a direction toward the left of the drawing. It is also assumed that the entire member bends to the left and that the only null point, at which there is no deflection, is at the point of support of the member. FIG. 5b differs from FIG. 5a only in that a second null point is assumed to exist near the end of the member 10. FIG. 5b therefore represents a different mode of vibration from the one shown in FIG. 5a. Which mode is actually present will depend on a number of factors, such as the physical constraints provided by other structural members, the natural vibrational modes of the member 10, and so forth. The important point to note from FIGS. 5a and 5b is that the collocated sensor 18 senses the same direction of vibrational movement for both modes. This follows because the collocated sensor 18 is, by definition, located immediately adjacent to the actuator and will therefore always "see" the same direction of displacement as is induced by the actuator. On the other hand, the nearly collocated sensor 20 may see a deformation in either direction. For example, in the mode shown in FIG. 5a the sensor 20 detects a bending movement in the same sense as the actuator, but in the mode shown in FIG. 5b the sensor 20 detects a bending movement in the opposite direction.

In a complex structure, the weighting factors applied to the sensors 18, 20 may be best selected by electronically varying the transfer function between the actuator input signals and the sensor output signals, to obtain a desired result for the particular structure. FIG. 6a shows a typical transfer function between the actuator and the collocated sensor 18 over a range of vibrational frequencies, plotted along the horizontal axis on a logarithmic scale. The output voltage, also plotted on a logarithmic scale, is the sensor output for a one-volt input to the actuator. It will be noted that the transfer function passes through a series of discontinuities at maximum and minimum values, referred to as poles and zeros. For example, the sensor output rises first gradually, and then more rapidly, as the frequency is increased, until a first-pole maximum is reached at a frequency of about 3 Hz. Then the output signal falls rapidly to a first zero at about 3.3 Hz. The cycle repeats through successive poles and zeros as the frequency is increased.

FIG. 6b shows a typical transfer function for a compensated sensor, having a weighted output given by: $S = S_C + 9S_{NC}$. The positions of the first and second poles are practically the same as in FIG. 6a, but the first zero point has been moved closer to the second pole. For a particular structure and vibrational damping application, the weighting factors applied to the sensors 18, 20 can be varied electronically to obtain a desired composite transfer function between the actuator and the sensors.

Yet another variant of the invention may be used to monitor one vibrational mode shape but not a higher mode of vibration. For example, the higher mode of vibration may tend to drive the vibrational control system unstable. If the nearly collocated sensor 20 is placed in such a position that its signal due to the higher mode of vibration is of opposite sign to the signal from the collocated sensor 18, appropriate averaging electronics can be used to ensure that the signals resulting from the higher mode of vibration cancel out. This might require that the nearly collocated sensor 20 be located further away from the actuator than in other applications. For example, the mode shown in FIG. 5b could be ignored if the sensor signals were appropriately weighted, since they have opposite signs. On the other hand, signals generated as a result of vibration in the mode shown in FIG. 5a would be detected as desired.

It will be appreciated from the foregoing that the present invention represents a significant advance in the field of deformation sensing. In particular, the invention provides a simple but effective technique for sensing the overall deformation in a structural member subject to deformation by local actuators, using only two deformation sensors, and without costly optical equipment.

It will also be appreciated that, although various embodiments of the invention have been described in detail for purposes of illustration, various modifications may be made without departing from the spirit and scope of the invention. Accordingly, the invention is not to be limited except as by the appended claims.

We claim:

1. A deformation sensing system for use in measuring the deformation of a structural member subject to deformation by an actuator, the deformation sensing device comprising:
   a collocated sensor positioned on the structural member in a region of influence of an actuator operating on the structural member;
   a nearly collocated sensor positioned on the structural member outside the region of influence of the actuator; and
   means for combining output signals generated by the collocated sensor and the nearly collocated sensor in such a way as to yield a composite signal whose magnitude is approximately proportional to the average strain over the entire structural member.

2. A deformation sensing system as defined in claim 1, wherein the means for combining the output signals of the sensors includes:
   means for multiplying the output of the collocated sensor by a weighting factor proportional to the length of the region of influence of the actuator, to obtain a first weighted output;
   means for multiplying the output of the nearly collocated sensor by a weighting factor proportional to the length of the structural member excluding the region of influence of the actuator, to obtain a second weighted output; and
   means for adding the weighted outputs to obtain the composite signal.

3. A deformation sensing system as defined in claim 1, wherein the means for combining the output signals of the sensors includes:
   means for multiplying the outputs of the sensors by respective weighting factors, to obtain weighted outputs; and
   means for adding the weighted outputs to obtain the composite signal;
   wherein the weighting factors are selected to provide a desired transfer function between the actuator input signal and the composite output signal.

4. A deformation sensing system as defined in claim 1, wherein:
   the collocated sensor and the nearly collocated sensor are lateral-mode piezoelectric sensors;
   the ratio of the surface area of the collocated sensor to the surface area of the nearly collocated sensor is approximately the same as the ratio of length of the region of influence of the actuator to the length of the structural member excluding the region of influence of the actuator; and
   the means for combining the output signals includes means for adding the output signals.

5. A deformation sensing system as defined in claim 1, wherein:
   the collocated sensor and the nearly collocated sensor are shear-mode piezoelectric sensors connected by a bridge; and
   the ratio of the length of that portion of the bridge that overlaps the region of influence of the actuator to that portion of the length of the bridge that does not overlap the region of influence of the actuator, is approximately the same as the ratio of the length of the region of influence of the actuator to the length of the structural member excluding the region of influence of the actuator.

6. A method for estimating the overall deformation in a structural member subject to deformation by an actuator, the method comprising the steps of:
   placing a first deformation sensor in a region of influence of an actuator coupled to a structural member;
   placing a second deformation sensor immediately outside the region of influence of the actuator; and
   combining output signals generated by the first and second deformation sensors in such a way as to yield a composite signal approximately proportional to the average strain over the entire structural member.

7. A method as defined in claim 6, wherein the step of combining the output signals includes:
   multiplying the output signals from the first and second deformation sensors by weighting factors, to provide first and second weighted output signals; and
   adding the first and second weighted output signals to obtain the composite signal.

8. A method as defined in claim 6, wherein the step of combining the output signals includes:
   multiplying the output of the first sensor by a weighting factor proportional to the length of the region of influence of the actuator, to obtain a first weighted output;
   multiplying the output of the second sensor by a weighting factor proportional to the length of the structural member excluding the region of influence of the actuator, to obtain a second weighted output; and
   adding the weighted outputs to obtain the composite signal.

9. A method as defined in claim 6, wherein:
   the first and second sensors are lateral-mode piezoelectric sensors;
   the ratio of the surface area of the first sensor to the surface area of the second sensor is approximately the same as the ratio of length of the region of influence of the actuator to the length of the structural member excluding the region of influence of the actuator; and
   the step of combining the output signals includes adding the output signals.

10. A method as defined in claim 6, wherein:
    the first and second sensors are shear-mode piezoelectric sensors connected by a bridge; and
    the steps of positioning the sensors is performed such that the ratio of the length of the bridge overlapping the region of influence of the actuator to the length of the bridge not overlapping the region of influence of the actuator is approximately the same as the ratio of the length of the region of influence of the actuator to the length of the structural member excluding the region of influence of the actuator.

11. A structure having a normal position, and a deformed position in which the structure is subject to strain resulting from external application of stress forces, the structure being adapted to respond to the strain induced by the external stress forces and to restore itself to the normal position, the structure comprising:
- at least one elastically deformable member;
- actuator means associated with the member, for applying stress to the member in such a manner as to produce a strain opposite in sense to that induced by the external stress forces acting on the structure;
- deformation sensing means having a collocated sensor associated with the member in a region of influence of the actuator means, and a nearly collocated sensor associated with the member outside the region of influence of the actuator; and
- means for combining output signals generated by the collocated sensor and the nearly collocated sensor, to generate a composite signal for coupling to the actuator means, the composite signal being representative of the average strain in the structural member.

12. An elastically deformable structure having a normal position, and a deformed position in which the structure is subject to strain resulting from external application of stress forces, said structure being adapted to respond to the strain induced by the external forces and to restore itself to the normal position, the structure comprising:
- at least one structural member;
- actuator means associated with the member, for applying stress to the member in such a manner as to produce a strain opposite in sense to that produced by the external stress forces acting on the structure;
- deformation sensing means comprising a collocated sensor associated with the member in a region of influence of the actuator means, and a nearly collocated sensor associated with the member outside the region of influence of the actuator, said sensors being positioned in a predetermined relationship relative to the actuator and each other;
- means for combining output signals generated by the collocated sensor and the nearly collocated sensor, to generate a composite signal for coupling to the actuator means, the composite signal being a function of the predetermined relationship and located of the sensors and the actuator means.

* * * * *